United States Patent [19]
Chatterji et al.

[11] Patent Number: 5,875,846
[45] Date of Patent: Mar. 2, 1999

[54] METHODS OF MODIFYING SUBTERRANEAN STRATA PROPERTIES

[75] Inventors: Jiten Chatterji; David D. Onan; Patty L. Onan, all of Duncan; Roger S. Cromwell, Walters; Bobby J. King, Duncan, all of Okla.

[73] Assignee: Halliburton Energy Services, Inc., Duncan, Okla.

[21] Appl. No.: 87,056

[22] Filed: May 29, 1998

Related U.S. Application Data

[63] Continuation-in-part of Ser. No. 914,594, Aug. 18, 1997.
[51] Int. Cl.$^6$ .................................................. E21B 43/12
[52] U.S. Cl. .......................... 166/293; 166/295; 166/300; 405/264
[58] Field of Search .................................. 166/292–295, 166/285, 300; 405/264

[56] References Cited

U.S. PATENT DOCUMENTS

| | | | |
|---|---|---|---|
| 3,082,823 | 3/1963 | Hower | 166/29 |
| 3,467,208 | 9/1969 | Kelly | 175/72 |
| 3,960,801 | 6/1976 | Cole et al. | 260/33.6 EP |
| 3,976,135 | 8/1976 | Anderson | 166/276 |
| 4,072,194 | 2/1978 | Cole et al. | 166/295 |
| 4,215,001 | 7/1980 | Elphingstone et al. | 252/8.55 C |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Armbruster | 166/280 |
| 5,159,980 | 11/1992 | Onan et al. | 166/294 |
| 5,168,928 | 12/1992 | Terry et al. | 166/292 |
| 5,293,938 | 3/1994 | Onan et al. | 166/293 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,373,901 | 12/1994 | Norman et al. | 166/300 |
| 5,377,757 | 1/1995 | Ng | 166/277 |
| 5,547,027 | 8/1996 | Chan et al. | 166/295 |

FOREIGN PATENT DOCUMENTS

| | | | |
|---|---|---|---|
| WO 91/02703 | 7/1991 | WIPO | C04B 24/24 |
| WO 94/12445 | 9/1994 | WIPO | E21B 33/13 |

*Primary Examiner*—Roger Schoeppel
*Attorney, Agent, or Firm*—Craig W. Roddy; C. Clark Dougherty, Jr.

[57] ABSTRACT

The present invention provides methods of modifying the properties of a subterranean stratum penetrated by a well bore to increase its strength and decrease its permeability. The methods basically include the steps of preparing a hardenable epoxy composition having flexibility upon hardening, pumping the epoxy composition into the subterranean stratum by way of the well bore and by way of the porosity of the stratum and then allowing the epoxy composition to harden in the stratum.

20 Claims, No Drawings

METHODS OF MODIFYING SUBTERRANEAN STRATA PROPERTIES

RELATED U.S. APPLICATION DATA

This application is a continuation-in-part of application Ser. No. 08/914,594 filed on Aug. 18, 1997.

BACKGROUND OF THE INVENTION

1. Field of the Invention

The present invention relates generally to methods of modifying the properties of subterranean strata, and more particularly, to methods of increasing the strength while decreasing the permeability of the strata.

2. Description of the Prior Art

Hydraulic cement compositions are commonly utilized in oil, gas and water well completion and remedial operations. For example, hydraulic cement compositions are used in primary cementing operations whereby a string of pipe such as casing is cemented in a well bore. In performing primary cementing, a hydraulic cement composition is pumped into the annular space between the walls of the well bore and the exterior of a string of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some well locations, the subterranean strata into or through which wells are drilled have high permeabilities and low compressive and tensile strengths. As a result, the resistances of the strata to shear are low and they have low fracture gradients. When a well fluid such as a hydraulic cement composition is introduced into a well bore penetrating such a subterranean stratum, the hydrostatic pressure exerted on the walls of the well bore can exceed the fracture gradient of the stratum and cause the formation of fractures into which the cement composition is lost. While light weight cement compositions have been developed and used, subterranean strata are still encountered which have fracture gradients too low for even the light weight cement compositions to be utilized without fracture and lost circulation problems occurring.

In the foregoing and other well applications, it is often desirable to decrease the permeabilities of subterranean strata to prevent the inflow or outflow of fluids into or from well bores or into or from producing zones, industrial sites, disposal formations and the like.

Thus, there are needs for methods of modifying the properties of subterranean strata penetrated by well bores to increase their strengths and resistance to shear failure and to decrease their permeabilities.

SUMMARY OF THE INVENTION

The present invention provides methods of modifying the properties of subterranean strata to increase their strengths and resistances to shear failure while decreasing their permeabilities which meet the needs described above and overcome the deficiencies of the prior art. The methods basically comprise the steps of preparing a hardenable epoxy composition having flexibility upon hardening, pumping the epoxy composition into a subterranean stratum by way of the well bore penetrating it and by way of the porosity of the stratum and then allowing the epoxy composition to harden in the stratum.

Upon hardening, the resulting flexible epoxy composition substantially eliminates the permeability of the stratum adjacent to the well bore and increases its strength and resistance to shear failure. As a result, the fracture gradient of the stratum adjacent to the well bore is appreciably increased and the flow of fluids through the porosity of the stratum is eliminated.

It is, therefore, a general object of the present invention to provide methods of modifying the properties of subterranean strata.

Other and further objects, features and advantages of the present invention will be readily apparent to those skilled in the art upon a reading of the description of preferred embodiments which follows.

DESCRIPTION OF PREFERRED EMBODIMENTS

As mentioned above, oil, gas and water wells are often drilled into subterranean strata having high permeabilities and low resistances to shear failure. When conventional well treatment fluids enter such strata by way of the well bores penetrating them, the fracture gradients of the strata can often be exceeded. As a result, fractures are formed in the strata and the fluids are lost therein. In many cases, the fracture gradients of such strata are so low that wells drilled into the strata cannot be completed and must be abandoned. The term "fracture gradient" is used herein to mean the hydraulic pressure per unit depth required to be exerted in a subterranean stratum to cause fractures therein.

In other applications, it is often desirable to decrease the permeabilities of subterranean strata to prevent the inflow or outflow of fluids into or from well bores penetrating the strata, e.g. undesirable water produced into the well bores or loss of well drilling or treating fluids from the well bores into the strata. In still other applications, it is often desirable to form subterranean impermeable barriers to prevent the flow of fluids into or out of industrial sites, waste disposal formations and the like.

By the present invention, methods of modifying the properties of subterranean strata penetrated by well bores to increase their strengths and decrease their permeabilities are provided. The methods of the present invention basically comprise preparing a hardenable epoxy composition containing one or more epoxide containing materials which has a viscosity such that it will enter the porosity of the subterranean stratum to be treated and which upon hardening, increases the strength and decreases the permeability of the stratum. Once prepared, the epoxy composition is pumped into the subterranean stratum by way of a well bore penetrating the stratum and by way of the porosity of the stratum. Thereafter, the epoxy composition is allowed to harden in the stratum into a highly flexible impermeable mass therein. The sealing compositions which are useful in accordance with the present invention are epoxy compositions comprised of one or more epoxide containing materials, i.e., an epoxy resin or an epoxide containing liquid, or both, and at least one hardening agent.

While various epoxy resins can be utilized, preferred such resins are those selected from the condensation products of epichlorohydrin and bisphenol A. A particularly suitable such resin is commercially available from the Shell Chemical Company under the trade designation "EPON®RESIN 828". This epoxy resin has a molecular weight of about 340 and a one gram equivalent of epoxide per about 180 to about 195 grams of resin. Another preferred epoxy resin is a condensation product of epichlorohydrin and bisphenol A which is predispersed in a non-ionic aqueous fluid and is commercially available from the Shell Chemical Company under the trade designation "EPI-REZ®-3510-W-60". This epoxy resin has a molecular weight of about 340 and a one gram equivalent of epoxide per 195 grams of resin. Another preferred epoxy resin is an epoxidized bisphenol A novalac resin which is predispersed in a non-ionic aqueous fluid and is commercially available from the Shell Chemical Company under the trade designation "EPI-REZ®-5003-W-55". This epoxy resin has a one gram equivalent of epoxide per about 205 grams of resin.

When used, the epoxy resin is generally included in an epoxy composition of this invention in an amount in the range of from about 10% to about 90% by weight of the epoxy composition, preferably in an amount of about 50%.

A solvent comprised of one or more aromatic hydrocarbons or a low viscosity epoxide containing liquid or a mixture of such epoxide containing liquids can be utilized to modify the viscosity of the epoxy resin used and to add flexibility and resiliency to the epoxy composition after hardening. An epichlorohydrin/bisphenol A condensation epoxy resin which has been modified with an aromatic solvent is commercially available from the Shell Chemical Company under the trade designation "EPSEAL RE®". A particularly suitable liquid hydrocarbon solvent for epoxy resins is comprised of a mixture of hydrocarbons containing from about 50% to about 99% of one or more aromatic hydrocarbons by weight of the solvent. Such a solvent is commercially available under the tradename "CYCLO SOL 63™" from Shell Chemical Co. of Houston Tex.

When an aromatic solvent or an epoxide containing liquid or mixture of such liquids is included in an epoxy composition of this invention to modify the viscosity of an epoxy resin therein, the solvent or epoxide containing liquid or mixture is generally present in an amount in the range of from about 20% to about 40% by weight of the epoxy composition, preferably in an amount of about 27%. An epoxide containing liquid or a mixture of such liquids can also be utilized as the only epoxide source in an epoxy composition of this invention.

While various epoxide containing liquids can be used, preferred such liquids are the diglycidyl ether of 1,4-butanediol, the diglycidyl ether of neopentylglycol and the diglycidol ether of cyclohexanedimethanol. A suitable epoxide containing liquid comprised of the diglycidyl ether of 1,4-butanediol is commercially available from the Shell Chemical Company under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical Company under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid or mixture is utilized as the only epoxide source in an epoxy composition of this invention, the epoxide containing liquid or mixture is generally present in an amount in the range of from about 20% to about 80% by weight of the epoxy composition, preferably in an amount of about 50%.

A variety of hardening agents including, but not limited to, aliphatic amines, amide amines, amido amines, imidazoles, aliphatic tertiary amines, aromatic amines, cycloaliphatic amines, heterocyclic amines, polyamides, polyethylamines and carboxylic acid anhydrides can be utilized in the compositions of this invention containing the above described epoxide containing materials. Of these, aliphatic amines, aromatic amines and carboxylic acid anhydrides are the most suitable.

Examples of aliphatic and aromatic amine hardening agents are triethylenetetraamine, ethylenediamine, N-cocoalkyltri-methylenediamine, isophoronediamine, diethyltoluenediamine, and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltri-methylenediamine, isophoronediamine, diethyltoluenediamine and tris(dimethylaminomethylphenol) are preferred, with isophoronediamine, diethyletoluenediamine and tris (dimethylaminomethylphenol) being the most preferred. The hardening agent or agents utilized are included in the epoxy compositions of the present invention in an amount in the range of from about 20% to about 50% by weight of the compositions.

The epoxy compositions can also include a particulate filler such as crystalline silicas, amorphous silicas, clays, calcium carbonate or barite. When such a filler is utilized, it is added to an epoxy composition of this invention in an amount in the range of from about 100% to about 300% by weight of the composition.

An organosilane compound can optionally be included in the epoxy compositions. The organosilane functions in the epoxy compositions to impart high subterranean strata surface bond strengths to the compositions. The organosilane compound undergoes hydrolysis in the presence of trace quantities of water whereby trialkoxysilanols are formed which dehydrate and form strong bonds. That is, the dehydration results in the formation of bonds with silica in the strata.

Suitable organosilane compounds include 3-aminopropyltrimethyoxysilane, 3-aminopropyltriethoxysilane, N-2-(aminoethyl)-3-ammopropyltriethoxysilane and 3-glycidoxy-propyltrimethoxysilane. Of these, 3-glycidoxypropyltrimethoxysilane is preferred. When used, the organosilane compound is included in an epoxy composition of this invention in an amount in the range of from about 0.1% to about 5% by weight of the epoxy composition, preferably in an amount of about 0.5%.

As mentioned, the above described epoxy compositions which do not include aromatic hydrocarbon solvents can be dispersed in an aqueous carrier liquid to enhance the ability of the composition to enter the porosity of water wet strata. To facilitate preparing the aqueous dispersion when the epoxy composition includes an epoxy resin, a commercially available water borne epoxy resin can be utilized. That is, the epoxide containing liquid and hardening agent used with the epoxy resin can be dispersed in the water borne epoxy resin to form an aqueous dispersion of the epoxy resin composition.

In order to further illustrate the methods and compositions of this invention, the following examples are given.

EXAMPLE 1

Sandstone cores with and without a hardened epoxy composition and the hardened epoxy composition alone were tested for compressive strength, tensile strength, Young's Modulus and Poisson's Ratio, all in accordance with the standardized tests and procedures of the American Society for Testing and Materials (ASTM) set forth, for example, in ASTM testing procedure D1456. The test apparatus used is described in U.S. Pat. No. 5,325,723 issued to Meadows, et al. on Jul. 5, 1994. All of the tests were conducted under a confining pressure of 1000 psig. Young's Modulus and Poisson's Ratio describe the elastic properties of the tested samples.

The tests were conducted using a sandstone core alone, a hardened epoxy composition alone and a sandstone core after it was saturated with an epoxy composition and the epoxy composition was allowed to harden for a time of three days at a temperature of 140° F. The epoxy composition used in the tests was comprised of the diglycidyl ether of neopentyl glycol and a isophorone diamine hardening agent present in the composition in an amount of about 20% by weight of the diglycidyl ether.

The results of these tests are given in Table I below.

TABLE I

STRENGTH AND ELASTICITY TESTS[1]

| Material Tested | Compressive Strength, psi | Tensile Strength, psi | Young's Modulus ($E \times 10^6$) | Poisson's Ratio |
|---|---|---|---|---|
| Sandstone Alone | 10,434 | 417 | 1.556 ± 0.0023 | 0.357377 ± 0.003519 |
| Hardened Epoxy Composition[2] Alone | 11,743 | 2,980 | 0.418 ± 0.0003 | 0.481125 ± 0.001567 |
| Sandstone Saturated with Hardened Epoxy Composition | 23,794 | 2,770 | 2.092 ± 0.0084 | 0.110611 ± 0.002495 |

[1]The confining pressure was 1000 psig.
[2]Shell Oil Co. "HELOXY ®68" epoxide containing liquid with 23% by weight isophorone diamine hardening agent.

From Table I it can be seen that the sandstone core saturated with the hardened epoxy composition had excellent compressive and tensile strengths as well as elasticity.

EXAMPLE 2

Water permeability tests were conducted in accordance with the procedures and apparatus set forth and described in the American Petroleum Institute (API) Recommended Practice For Core Analysis Procedure, API RP 40. Sandstone cores treated with various hardened epoxy compositions, the compositions alone and a sandstone core alone were tested. The various epoxy compositions used in the tests are set forth in Table II below and the results of the tests are set forth in Table III below.

TABLE II

EPOXY COMPOSITIONS

| | | COMPOSITION | | COMPONENTS | |
|---|---|---|---|---|---|
| Composition Designation | Epoxy Resin | % by weight of composition | Epoxide Containing Liquid | % by weight of composition | Hardening Agent | % by weight of composition |
| A | None | — | Diglycidyl ether[1] of 1,4-butanediol | 76.4 | Isophorone Diamine | 23.6 |
| B | None | — | Diglycidyl ether[2] of neopentyl gylcol | 79.3 | Isophorone Diamine | 20.7 |
| C | None | 56.1 | Diglycidyl ether[3] of cyclohexane dimethanol | 37.4 | Triethylenetetramine | 6.5 |
| D | Condensation product[4] of epichlorohydrin and bisphenol A | 70.1 | Diglycidyl ether[4] of 1,4-butanediol | 23.4 | Triethylenetetramine | 6.5 |

[1]Shell Oil Co. "HELOXY ®67"
[2]Shell Oil Co. "HELOXY ®68"
[3]Shell Oil Co. "HELOXY ®107"
[4]Shell Oil Co. "EPON ®828"

TABLE III

PERMEABILITY TESTS

| Core No. | Core Material | Saturated with Hardened Epoxy Composition | Epoxy Composition Used | Test Liquid Used | Test Pressure, psig | Flow rate, ml/min | Permeability, md |
|---|---|---|---|---|---|---|---|
| 1 | Sandstone | No | — | Fresh Water | 165 | 5 | 908.6 |
| 2 | Sandstone | Yes | A[1] | Fresh Water | 1000 | 0 | >0.001 |
| 3 | Sandstone | Yes | B[2] | Fresh Water | 1000 | 0 | >0.001 |
| 4 | Sandstone | Yes | C[3] | Fresh Water | 1000 | 0 | >0.001 |
| 5 | Sandstone | Yes | D[4] | Fresh Water | 1000 | 0 | >0.001 |
| 6 | Hardened Epoxy Composition | — | A[1] | Fresb Water | 1000 | 0 | >0.001 |
| 7 | Hardened Epoxy Composition | — | B[2] | Fresh Water | 1000 | 0 | >0.001 |
| 8 | Hardened Epoxy Composition | — | C[3] | Fresh Water | 1000 | 0 | >0.001 |

[1] 76.4% by weight Shell Oil Co. "HELOXY ®68" epoxide containing liquid and 23,6% by weight hardening agent.
[2] 79.3% by weight Shell Oil Co. "HELOXY ®107" epoxide containing liquid and 20.7% by weigbt hardening agent.
[3] 56.1% by weight Shell Oil Co. "EPON ®828" epoxy resin, 37.4% by weight "HELOXY ®67" epoxide containing liquid and 6.5% by weight hardening agent.
[4] 70.1% by weight Shell Oil Co. "EPON ®828" epoxy resin, 23.4% by weight "HELOXY ®67" epoxide containing liquid and 6.5% by weight hardening agent.

From Tables II and III it can be seen that the epoxy compositions utilized in accordance with this invention effectively reduce the permeability of subterranean strata materials.

Thus, the present invention is well adapted to carry out the objects and obtain the features and advantages mentioned as well as those which are inherent therein. While numerous changes may be made by those skilled in the art, such changes are encompassed within the spirit of this invention as defined by the appended claims.

What is claimed is:

1. A method of modifying the properties of a subterranean stratum penetrated by a well bore comprising the steps of:
   (a) preparing a hardenable epoxy composition having flexibility upon hardening comprised of an epoxide containing material and a hardening agent;
   (b) pumping said epoxy composition into said subterranean stratum by way of said well bore and by way of the porosity of said stratum; and
   (c) allowing said epoxy composition to harden in said stratum.

2. The method of claim 1 wherein said epoxide containing material is an epoxy resin and a solvent for said resin.

3. The method of claim 2 wherein said epoxy resin is selected from the group of the condensation products of epichlorohydrin and bisphenol A and epoxidized bisphenol A novalac resin, and is present in said epoxy composition in an amount in the range of from about 20% to about 50% by weight thereof.

4. The method of claim 1 wherein said epoxide containing material is an epoxide containing liquid.

5. The method of claim 4 wherein said epoxide containing liquid is selected from the group of the diglycidyl ether of neopentyl glycol, the diglycidyl ether of cyclohexanedimethanol and mixtures of such liquids and is present in said composition in an amount in the range of from about 20% to about 80% by weight thereof.

6. The method of claim 1 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

7. The method of claim 1 wherein said hardening agent is at least one member selected from the group of triethylenetetraamine, ethylenediamine, N-cocoalykyltrimethylenediamine, isophoronediamine, diethyltoluenediamine and tris(dimethylaminomethylphenol) and is present in said composition in an amount in the range of from about 20% to about 50% by weight thereof.

8. The method of claim 1 wherein said epoxy composition is dispersed in water.

9. The method of claim 1 wherein said epoxy composition further comprises a particulate filler.

10. The method of claim 9 wherein said particulate filler is selected from the group consisting of crystalline silicas, amorphous silicas, clays, calcium carbonate and barite and is added to said composition in an amount in the range of from about 100% to about 300% by weight thereof.

11. The method of claim 1 wherein said epoxy composition further comprises an organosilane compound selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane present in said epoxy composition in an amount in the range of from about 0.1% to about 5% by weight thereof.

12. A method of modifying the properties of a subterranean stratum penetrated by a well bore to thereby increase its strength and decrease its permeability comprising the steps of:
   (a) preparing a hardenable epoxy composition having flexibility upon hardening comprised of an epoxy resin, a solvent for said epoxy resin and a hardening agent;
   (b) pumping said epoxy composition into said subterranean stratum by way of said well bore and by way of the porosity of said stratum; and
   (c) allowing said epoxy composition to harden in said stratum.

13. The method of claim 12 wherein said epoxy resin is selected from the group of the condensation products of epichlorohydrin and bisphenol A and epoxidized bisphenol A novalac resin, and is present in said epoxy composition in an amount in the range of from about 20% to about 50% by weight thereof.

14. The method of claim 13 wherein said epoxy resin is a condensation product of epichlorohydrin and bisphenol A and said solvent is comprised of one or more aromatic hydrocarbons.

15. The method of claim 13 wherein said solvent is an epoxide containing liquid selected from the group of diglycidyl ethers of 1,4-butanediol, neopentyl glycol and cyclohexane dimethanol and is present in said composition in an amount in the range of from about 20% to about 80% by weight of said epoxy resin in said composition.

16. The method of claim 15 which further comprises dispersing said hardenable epoxy composition in an aqueous carrier liquid.

17. The method of claim 12 wherein said hardening agent is at least one member selected from the group of aliphatic amines, aromatic amines, amide amines, amido amines, imidazoles and carboxylic acid anhydrides and is present in said composition in an amount in the range of from about 20% to about 50% by weight thereof.

18. The method of claim 12 wherein said hardening agent is at least one member selected from the group of triethylenetetraamine, ethylenediamine, N-cocoalkyltrimethylenediamine, isophoronediamine, diethyltoluenediamine and tris (dimethylaminomethylphenol) and is present in said composition in an amount in the range of from about 20% to about 50% by weight thereof.

19. The method of claim 12 wherein said epoxy composition further comprises an organosilane compound selected from the group of 3-aminopropyltrimethoxysilane, 3-aminopropyltriethoxysilane, N-2-(aminoethyl)-3-aminopropyltriethoxysilane and 3-glycidoxypropyltrimethoxysilane present in said epoxy composition in an amount in the range of from about 0.1% to about 5% by weight thereof.

20. The method of claim 12 wherein said epoxy composition further comprises a filler selected from the group of crystalline silicas, amorphous silicas, clays, calcium carbonate and barite and is present in said composition in an amount in the range of from about 15% to about 30% by weight of said composition.

* * * * *